(12) United States Patent
Pitzer et al.

(10) Patent No.: US 11,608,111 B2
(45) Date of Patent: Mar. 21, 2023

(54) END OF TRAVEL RELIEF SYSTEM FOR POWER STEERING SYSTEM

(71) Applicant: R.H. Sheppard Co. Inc., Hanover, PA (US)

(72) Inventors: Jared Pitzer, Red Lion, PA (US); Jeffrey Edward Tipton, Gettysburg, PA (US)

(73) Assignee: R.H. Sheppard Co. Inc., Hanover, PA (US)

( * ) Notice: Subject to any disclaimer, the term of this patent is extended or adjusted under 35 U.S.C. 154(b) by 449 days.

(21) Appl. No.: 17/012,229

(22) Filed: Sep. 4, 2020

(65) Prior Publication Data

US 2022/0073132 A1 Mar. 10, 2022

(51) Int. Cl.
*B62D 5/06* (2006.01)
*B62D 5/24* (2006.01)
(Continued)

(52) U.S. Cl.
CPC ............ *B62D 5/061* (2013.01); *B62D 3/08* (2013.01); *B62D 5/12* (2013.01); *B62D 5/24* (2013.01); *B62D 7/16* (2013.01); *B62D 7/20* (2013.01)

(58) Field of Classification Search
CPC ... B62D 5/24; B62D 7/16; B62D 7/20; B62D 5/065; B62D 5/12; B62D 5/081; B62D 5/061; F15B 13/024; F15B 15/24
(Continued)

(56) References Cited

U.S. PATENT DOCUMENTS 3,047,087 A * 7/1962 Jablonsky ................ B62D 5/08
  91/401
3,921,504 A * 11/1975 Mumford ................ F15B 15/24
  92/85 B
(Continued)

FOREIGN PATENT DOCUMENTS

CN 114704520 A * 7/2022
DE 1291644 B * 3/1969
(Continued)

OTHER PUBLICATIONS

U.S. Appl. No. 16/925,406, filed Jul. 10, 2020.

*Primary Examiner* — Jacob B Meyer
*Assistant Examiner* — Myles A Harris
(74) *Attorney, Agent, or Firm* — Reising Ethington P.C.

(57) ABSTRACT

In a power steering system employing an end of travel system including valve actuating rings disposed about a Pitman arm shaft, a device is provided for setting the positions of the rings on the shaft. The device includes a fixed member positioned about, and fixed against movement along, a longitudinal axis perpendicular to the shaft's rotational axis and a movable member that moves along the longitudinal axis relative to the fixed member. The movable member defines a pin at one end configured for engagement with the circumferential ends of the actuating rings. A positioning force applied to one of the members causes the movable member to move between set and reset positions in which the pin engages corresponding ends of the actuating rings during rotation of the shaft and a running position in which the pin remains disengaged from the ends of the actuating ring during rotation of the shaft.

20 Claims, 8 Drawing Sheets

(51) Int. Cl.
  *B62D 7/16* (2006.01)
  *B62D 3/08* (2006.01)
  *B62D 5/12* (2006.01)
  *B62D 7/20* (2006.01)

(58) Field of Classification Search
  USPC .................................................. 180/444
  See application file for complete search history.

(56) References Cited

U.S. PATENT DOCUMENTS

| | | | |
|---|---|---|---|
| 4,261,248 A * | 4/1981 | Elser | B62D 5/061 |
| | | | 91/401 |
| 6,003,431 A * | 12/1999 | Bertini | F15B 15/24 |
| | | | 91/405 |
| 7,152,627 B2 | 12/2006 | Danley et al. | |
| 9,080,646 B2 * | 7/2015 | Fuechsel | F16H 57/039 |
| 10,584,787 B2 * | 3/2020 | Segawa | B62D 5/0409 |
| 10,895,278 B2 * | 1/2021 | Kim | B62D 5/001 |
| 11,073,204 B2 * | 7/2021 | Diffin | F16H 55/24 |
| 11,293,522 B2 * | 4/2022 | Kirschstein | F16H 57/021 |
| 11,346,435 B2 * | 5/2022 | Kim | F16H 55/24 |
| 11,391,346 B2 * | 7/2022 | Diffin | F16H 57/12 |
| 2002/0073837 A1 * | 6/2002 | Niessen | F15B 15/065 |
| | | | 92/17 |
| 2002/0074041 A1 * | 6/2002 | Niessen | F15B 15/065 |
| | | | 137/385 |
| 2021/0009195 A1 * | 1/2021 | Tipton | B62D 5/12 |

FOREIGN PATENT DOCUMENTS

| | | | | |
|---|---|---|---|---|
| DE | 102021106889 B3 * | 10/2021 | | |
| DE | 102021106884 B3 * | 11/2021 | | |
| GB | 2182721 A * | 5/1987 | | F15B 15/24 |
| GB | 2182979 A * | 5/1987 | | F15B 15/24 |
| JP | H07117698 A * | 5/1995 | | |
| KR | 100378305 B1 * | 6/2003 | | |

* cited by examiner

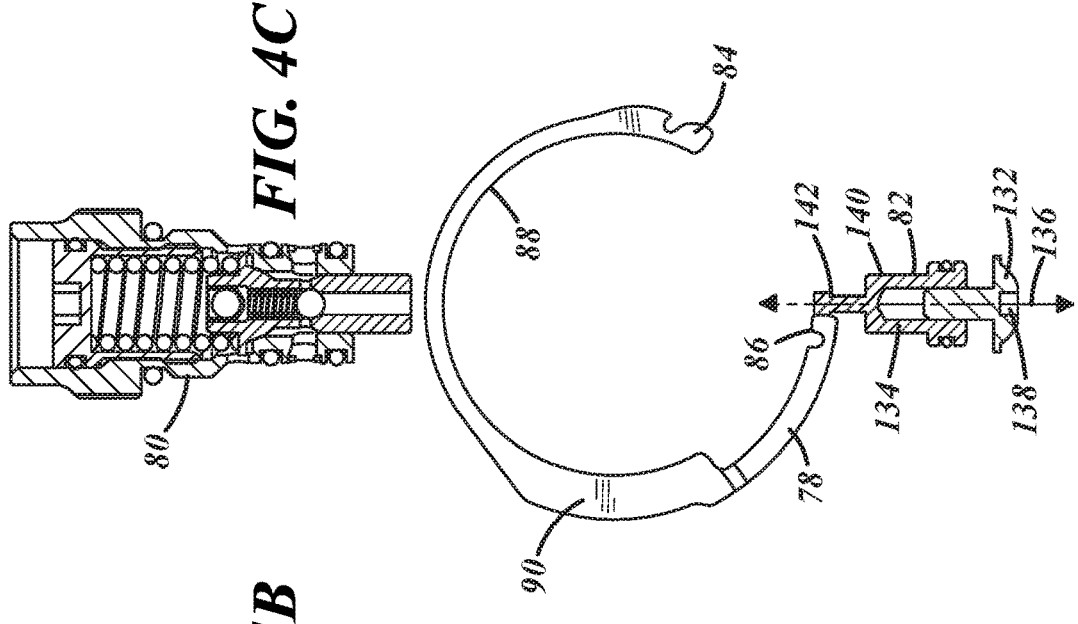
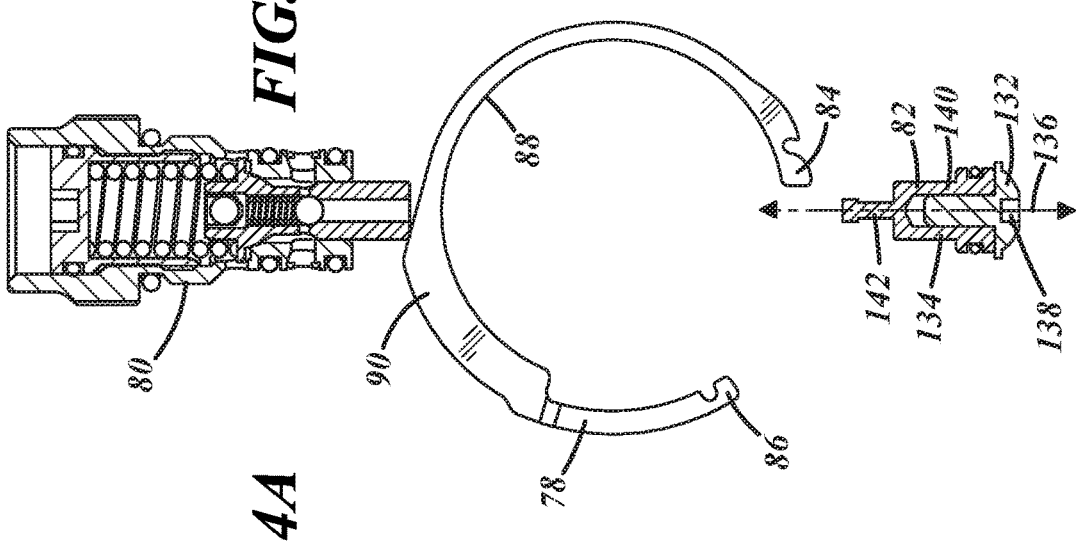
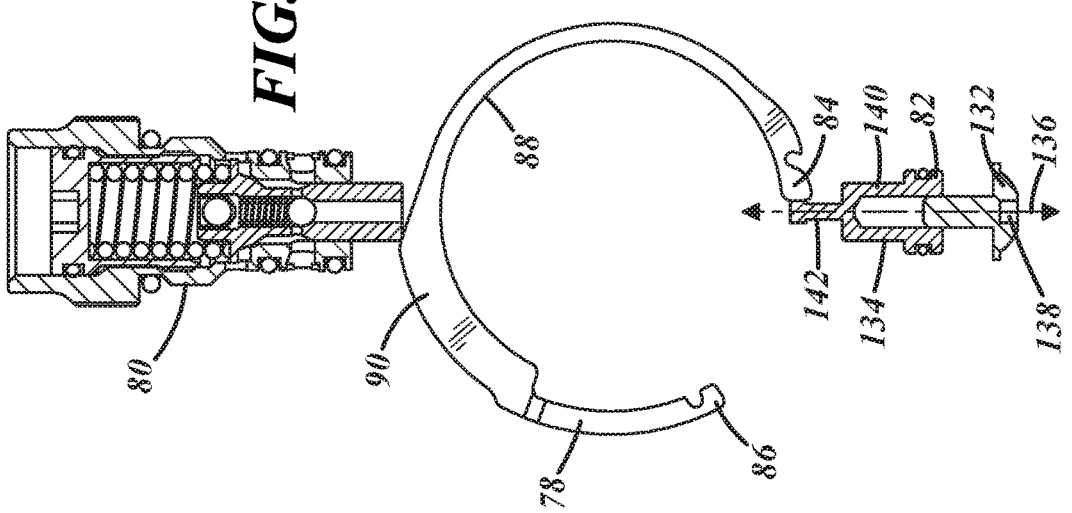

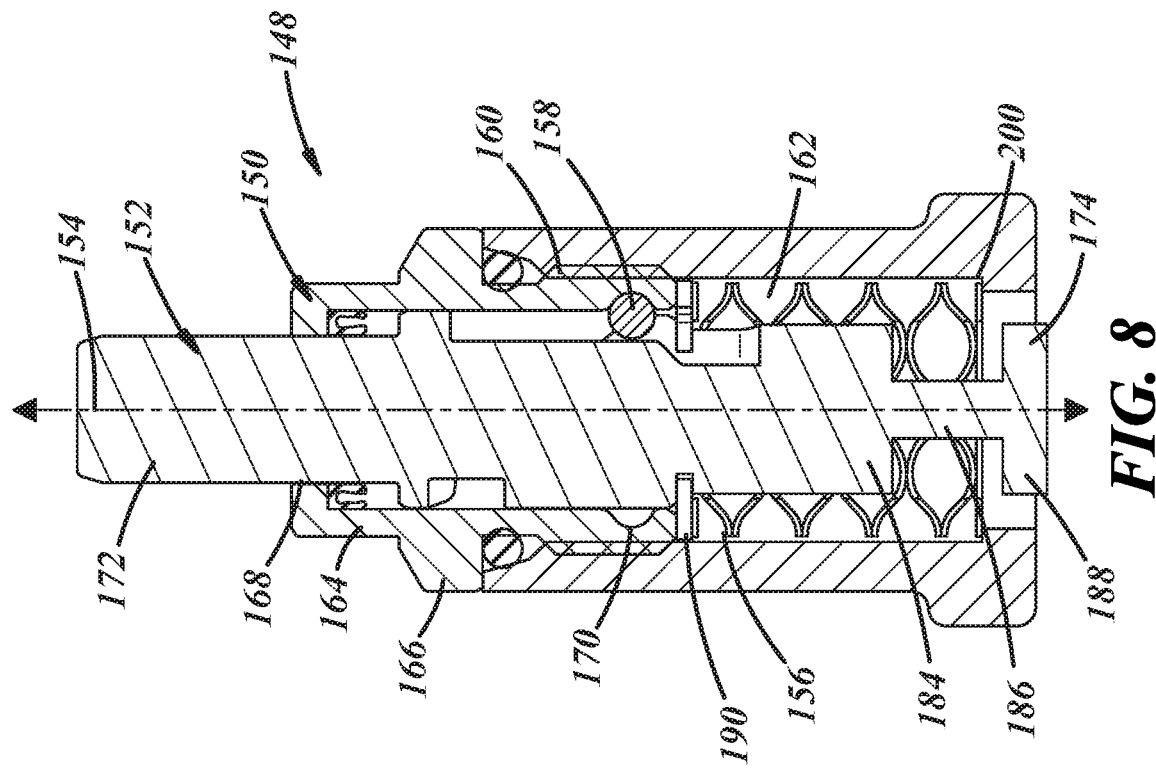

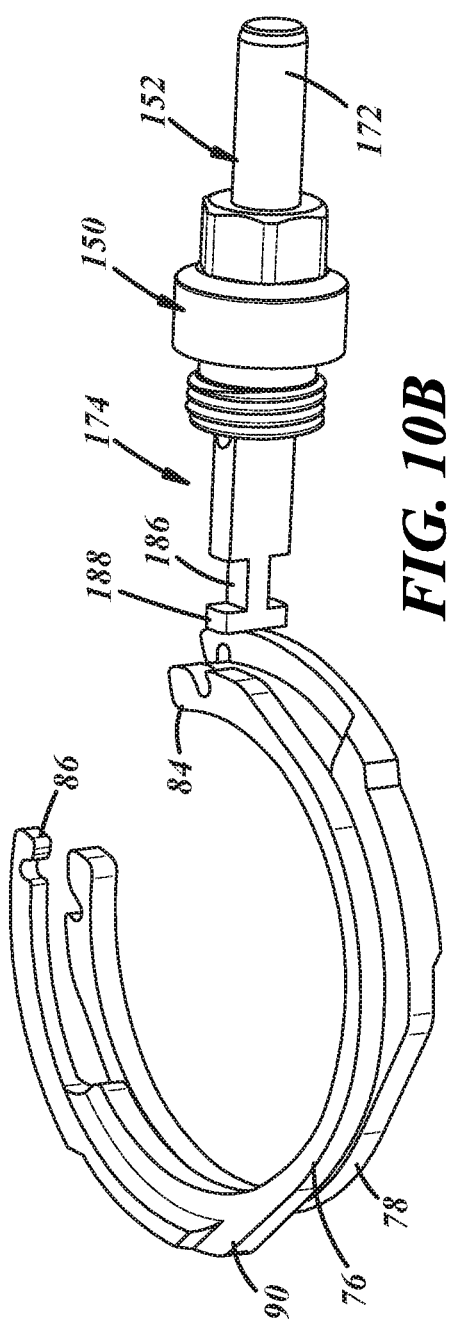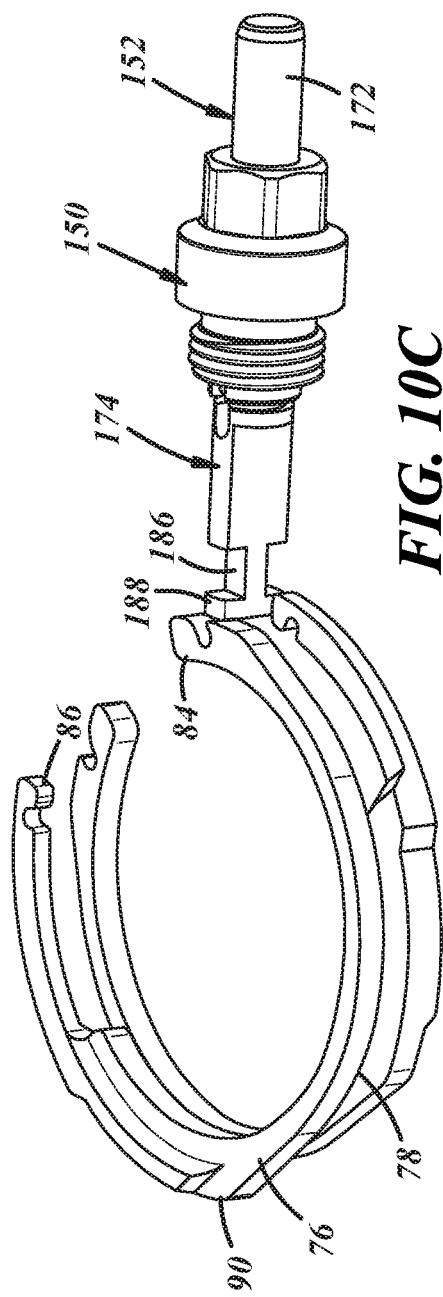

END OF TRAVEL RELIEF SYSTEM FOR POWER STEERING SYSTEM

BACKGROUND OF THE INVENTION a. Field of the Invention

This disclosure relates to power steering systems. In particular, this disclosure relates to an end of travel relief system for a power steering system employing valve actuating rings on a Pitman arm shaft and, more particularly, to a device used to set the position of the valve actuating rings on the Pitman arm shaft.

b. Background Art

Conventional vehicles include power steering systems that assist the vehicle operator in steering the vehicle by augmenting the force applied by the operator when turning the steering wheel. In commercial vehicles (sometimes referred to as heavy vehicles) such as trucks and buses, the power steering system typically comprises a recirculating ball system in which an internally threaded piston with an external toothed rack engaged with a sector gear on a shaft connected to a Pitman arm is driven by (i) a recirculating ball screw rotating inside of the piston responsive to movement of the steering wheel and (ii) fluid forces acting on either side of the piston to augment the force provided by the vehicle operator through the steering wheel.

The power steering systems in commercial vehicles often include an end of travel relief system that limits the power-assisted movement of the piston to protect steering components from excess stress. A conventional end of travel relief system includes one or more poppet valves that are unseated when the piston reaches a predetermined extent of travel in either direction and divert some of the working fluid from the fluid chamber. The piston can continue to travel beyond this point, but the power-assistance forces provided by the fluid is reduced.

Although conventional end of travel relief systems function well for their intended purpose, they often have a limited range of operation due to the available range of movement of the poppet valves. Further, tolerance stack ups in the power steering system can reduce the effective turn angles of a vehicle by causing premature activation of the end of travel relief system. In order to address these issues, the applicant developed a novel end of travel relief system which is set forth in commonly assigned U.S. patent application Ser. No. 16/925,406 filed Jul. 10, 2020 which is incorporated fully herein by reference. In this system, one or more poppet valves are actuated, not by the piston, but by a pair of actuating rings that rotate with the sector gear shaft coupled to the Pitman arm. The rotational position of the sector gear shaft corresponds to the linear travel of the piston. Use of the actuating rings to activate the valve(s), however, allows a wider range of operation through configuration of the valve actuating cam surfaces on the actuating rings. Further, the ability to adjust the position of the actuating rings relative to the sector gear shaft allows for compensation of tolerance stackups in the power steering system to prevent premature activation of the end of travel relief system. In the system described in U.S. patent application Ser. No. 16/925,406, the position of the actuating rings on the sector gear shaft is controlled through a reset gear disposed about the sector gear shaft and a screw gear in mesh with the reset gear. Tangs on the reset gear and surfaces of the screw gear engage portions of the actuating rings to position the rings relative to the sector gear shaft. Although this system has proven effective, Applicant has developed alternative devices for setting the position of the valve actuating rings that may provide certain advantages in terms of cost, packaging and design and are described herein.

The inventors herein have recognized a need for a power steering system and, in particular, an end of travel relief system for a power steering system that will minimize and/or eliminate one or more of the above-identified deficiencies.

BRIEF SUMMARY OF THE INVENTION

This disclosure relates to power steering systems. In particular, this disclosure relates to an end of travel relief system for a power steering system employing valve actuating rings on a Pitman arm shaft and, more particularly, to a device used to set the position of the valve actuating rings on the Pitman arm shaft.

One embodiment of a device for setting a position of an actuating ring relative to a Pitman arm shaft on which the actuating ring is disposed, the Pitman arm shaft configured for rotation about a rotational axis and the actuating ring forming part of an end of travel relief system for a power steering system, includes fixed and movable members. The fixed member is configured to be positioned about a longitudinal axis extending perpendicular to the rotational axis and to be fixed against movement along the longitudinal axis. The movable member is configured for movement along the longitudinal axis relative to the fixed member, the movable member defining a pin at a first end configured for engagement with first and second circumferential ends of the actuating ring. A positioning force applied to one of the fixed member and the movable member causes movement of the movable member along the longitudinal axis between (i) a set position in which the pin is configured to engage the first circumferential end of the actuating ring during rotation of the actuating ring in a first direction about the rotational axis, (ii) a reset position in which the pin is configured to engage the second circumferential end of the actuating ring during rotation of the actuating ring in a second direction, opposite the first direction, about the rotational axis, and (iii) a running position in which the pin remains disengaged from the first and second circumferential ends of the actuating ring during rotation of the actuating ring about the rotational axis in the first and second directions.

Another embodiment of a device for setting a position of an actuating ring relative to a Pitman arm shaft on which the actuating ring is disposed, the Pitman arm shaft configured for rotation about a rotational axis and the actuating ring forming part of an end of travel relief system for a power steering system, includes a tubular body disposed about a longitudinal axis extending perpendicular to the rotational axis, the tubular body defining an outer ball race in a radially inner surface. The device further includes a shaft configured to be received within the tubular body and to move within the tubular body along the longitudinal axis in response to a positioning force. The shaft defines a pin at a first end configured for engagement with first and second circumferential ends of the actuating ring, a button at a second end opposite the first end configured to receive the positioning force, upper and lower cam surfaces between the first and second ends of the shaft, and an inner ball race disposed between the upper and lower cam surfaces and opposing the outer ball race. The device further includes a ball disposed between the inner and outer ball races and fixed against axial and radial movement relative to the longitudinal axis. A positioning force applied to the button of the shaft causes movement of the ball along the upper and lower cam surfaces and around the rotational axis and movement of the shaft along the longitudinal axis between (i) a set position in which the pin is configured to engage the first circumferential end of the actuating ring during rotation of the actuating ring in a first direction about the rotational axis, (ii) a reset position in which the pin is configured to engage the second circumferential end of the actuating ring during rotation of the actuating ring in a second direction, opposite the first direction, about the rotational axis, and (iii) a running position in which the pin remains disengaged from the first and second circumferential ends of the actuating ring during rotation of the actuating ring about the rotational axis in the first and second directions.

A power steering system in accordance with one embodiment includes a steering gear including a piston configured for movement within a fluid chamber responsive to movement of a steering wheel and fluid pressure on either side of the piston. The piston defines a toothed rack. The system further includes a Pitman arm shaft including a sector gear in engagement with the toothed rack and configured for rotation about a rotational axis. The system further includes a Pitman arm coupled to the Pitman arm shaft and configured for coupling to a steering linkage. The system further includes an end of travel relief system for the piston. The end of travel relief system includes a first actuating ring disposed about the Pitman arm shaft and including a first cam extending radially outwardly therefrom, a second actuating ring disposed about the Pitman arm shaft and including a second cam extending radially outwardly therefrom, and a valve including a valve member configured for engagement with at least one of the first and second cams in response to rotation of the Pitman arm shaft about the rotational axis. The end of travel relief system further includes a device for setting a position of at least one of the first and second actuating rings relative to the Pitman arm shaft. The device includes a fixed member disposed about a longitudinal axis extending perpendicular to the rotational axis and fixed against movement along the longitudinal axis and a movable member configured for movement along the longitudinal axis relative to the fixed member. The movable member defines a pin at a first end configured for engagement with first and second circumferential ends of the at least one actuating ring. A positioning force applied to one of the fixed member and the movable member causes movement of the movable member along the longitudinal axis between (i) a set position in which the pin is configured to engage the first circumferential end of the at least one actuating ring during rotation of the at least one actuating ring in a first direction about the rotational axis, (ii) a reset position in which the pin is configured to engage the second circumferential end of the at least one actuating ring during rotation of the at least one actuating ring in a second direction, opposite the first direction, about the rotational axis and (iii) a running position in which the pin remains disengaged from the first and second circumferential ends of the at least one actuating ring despite rotation of the at least one actuating ring about the rotational axis in the first and second directions.

In one embodiment of the end of travel relief device, the fixed member comprises a tubular body defining an outer ball race in a radially inner surface. The movable member comprises a shaft configured to be received within the tubular body and to move within the tubular body along the longitudinal axis in response to the positioning force. The shaft defines a button at a second end opposite the first end defining the pin and configured to receive the positioning force. The shaft further defines upper and lower cam surfaces between the first and second ends of the shaft and an inner ball race disposed between the upper and lower cam surfaces and opposing the outer ball race. A ball disposed between the inner and outer ball races is fixed against axial and radial movement relative to the longitudinal axis, but application of the positioning force causes movement of the ball along the upper and lower cam surfaces and around the rotational axis thereby allowing movement of the shaft along the longitudinal axis between the set position, the reset position and the running position.

In another embodiment of the end of travel relief device, the movable member comprises a nut having a tubular body having a closed end and an open end. The body defines a first plurality of threads on a radially inner surface. The pin of the movable member extends from the closed end of the body. The fixed member comprises a screw configured to be received within the tubular body and defining a second plurality of threads configured for engagement with the first plurality of threads. Application of the positioning force causes rotation of the screw and movement of the nut along the longitudinal axis between the set position, the reset position and the running position.

A power steering system and an end of travel relief system for a power steering system, in accordance with the present teachings are advantageous relative to conventional systems. The end of travel relief system has a greater range of operation than conventional systems because the system is not dependent on the operating length of the poppet valve and can instead be controlled through appropriate formation of the cam surfaces on the actuating rings. The system also enables vehicle manufacturers and owners to account for tolerance stack ups in the power steering system that may otherwise cause premature activation of the end of travel relief system and reduce the effective turn angles of a vehicle by allowing easy adjustment of the position of the actuating rings relative to the sector gear shaft. In this regard, the devices described herein for adjusting the position of the actuating rings offer particular advantages because they are relatively inexpensive, occupy relatively little space and are not overly complex in design.

The foregoing and other aspects, features, details, utilities, and advantages of the present teachings will be apparent from reading the following description and claims, and from reviewing the accompanying drawings.

BRIEF DESCRIPTION OF THE DRAWINGS

FIGS. 4A-4C illustrate the end of travel relief system of FIG. 3 in three operating states: a setting state in which the actuating rings of the system are moved from their default positions to initial operating positions; a running state during normal operation of the power steering system; and a reset state during which the actuating rings are returned to their default positions.

FIG. 7 is a perspective of the device of FIG. 6 with certain external portions of the device made transparent to allow illustration of internal portions of the device.

FIG. 8 is a cross-sectional view of the device of FIG. 6.

FIGS. 10A-C are diagrammatic views illustrating the end of travel relief system with the device of FIGS. 6-8 in three operating states: a setting state in which the actuating rings of the system are moved from their default positions to initial operating positions; a running state during normal operation of the power steering system; and a reset state during which the actuating rings are returned to their default positions.

DETAILED DESCRIPTION OF THE INVENTION

Figure 1:
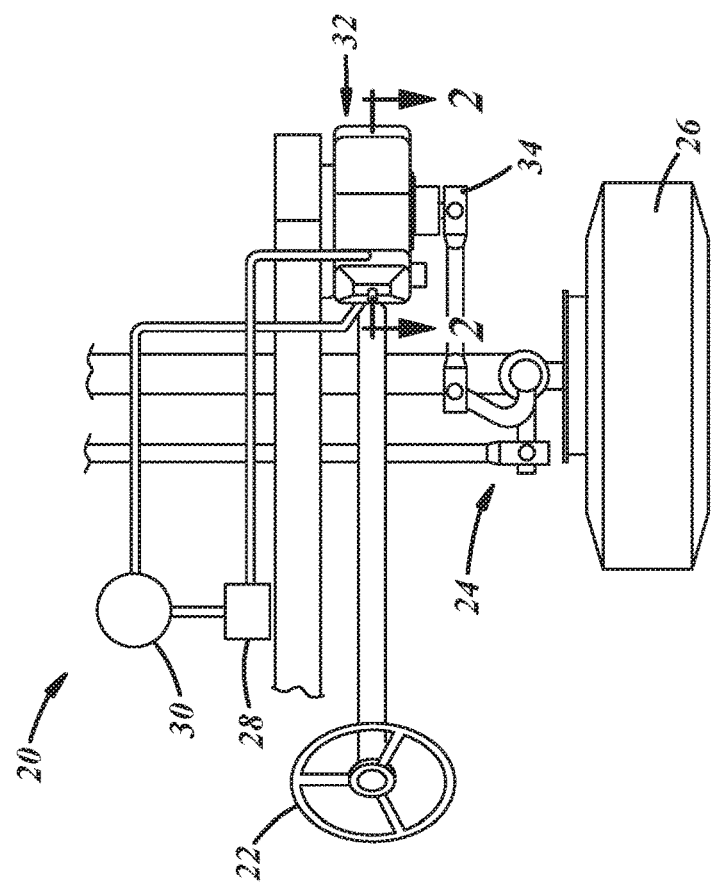
FIG. 1 is a diagrammatic view of one embodiment of a power steering system.

Referring now to the drawings wherein like reference numerals are used to identify identical components in the various views, FIG. 1 illustrates a power steering system 20 in accordance with the present teachings. System 20 is provided to transfer and augment forces input by the vehicle operator through a steering wheel 22 to a steering linkage 24 used in turning one or more steerable wheels 26 in a vehicle. System 20 may include a fluid reservoir 28, fluid pump 30, and a steering gear 32.

Fluid reservoir 28 stores a volume of power steering fluid used by steering gear 32 in augmenting the inputs of the vehicle operator. The size, shape and location of reservoir 28 may vary depending on the vehicle.

Fluid pump 30 extracts power steering fluid from fluid reservoir 28 and outputs the fluid at a relatively high pressure for delivery to steering gear 32. Pump 30 is conventional in the art.

Figure 2:
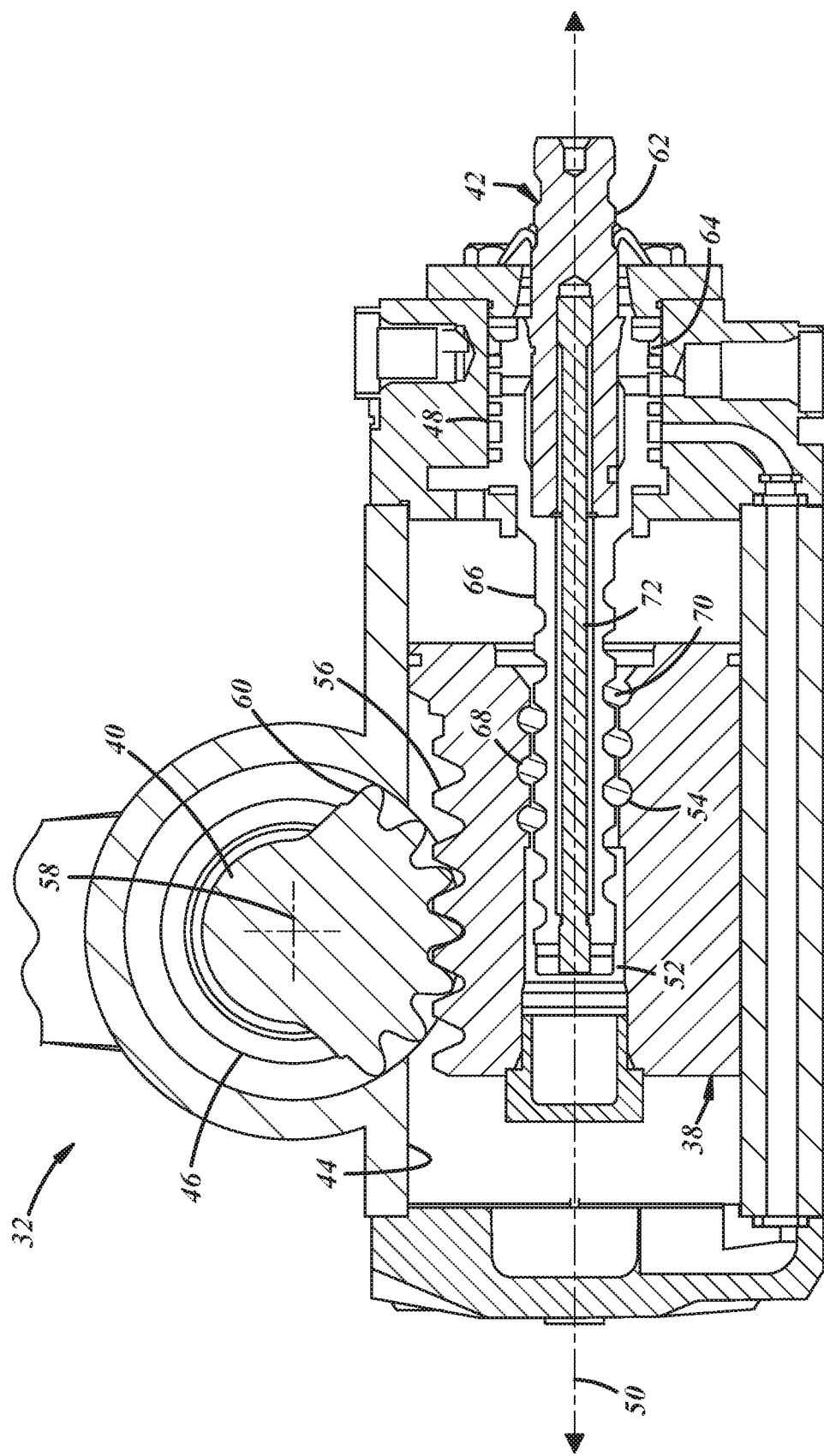
FIG. 2 is a cross-sectional view of a portion of the power steering system of FIG. 1.

Steering gear 32 transfers forces input by the vehicle operator from steering wheel 22 to a Pitman arm 34 coupled to steering linkage 24 and augments those inputs to provide power-assisted steering. Referring now to FIG. 2, steering gear 32 may include a housing 36, a piston 38, a sector gear shaft or Pitman arm shaft 40 and a fluid control valve 42.

Housing 36 positions and orients the other components of steering gear 32 and provides protection to those components from foreign objects and elements. Housing 36 may be made from conventional metals and metal alloys. The exact configuration of housing 36 will be dependent on the configuration of the other components of steering gear 32 including elements of the end of travel relief system described hereinbelow. Housing 36 defines a fluid chamber 44 configured to receive piston 38, a bore 46 extending transverse to the fluid chamber 44 and configured to receive Pitman arm shaft 40, a bore 48 configured to receive valve 42 and a plurality of fluid passages for directing fluid to and from chamber 44 on opposite sides of piston 38.

Piston 38 forms part of a hydraulic motor formed within steering gear 32. Piston 38 is disposed within fluid chamber 44 and is configured for movement along an axis 50 within fluid chamber 44 responsive to movement of steering wheel 22 and fluid pressure on either side of piston 38. Piston 38 includes a bore 52 extending at least partway therethrough that is configured to receive a member of valve 42 and that is sealed at either end. Piston 38 defines a plurality of threads 54 on a radially inner surface extending along at least a portion of bore 52 for a purpose described below. Piston 38 also defines a toothed rack 56 on a radially outer surface configured for engagement with Pitman arm shaft 40.

Sector gear shaft or Pitman arm shaft 40 is configured to translate linear movement of piston 38 into rotational movement of Pitman arm 34. Shaft 40 is disposed within bore 46 of housing 36 and is configured for rotation about a rotational axis 58. Shaft 40 defines a sector gear 60 at one end configured to engage rack 56 on piston 38. The other end of shaft 40 is coupled to Pitman arm 34. Shaft 40 includes a plurality of axially extending splines for a purpose described hereinbelow.

Fluid control valve 42 controls the flow of fluid from pump 30 to chamber 44 on either side of piston 38. Valve 42 is supported within housing 36 and in fluid communications with fluid inlets and outlets coupled to return and supply lines extending from fluid reservoir 28 and fluid pump 30 and with fluid passages extending between valve 42 and chamber 44 on opposite sides of piston 38. An inner member 62 of valve 42 may be coupled in a conventional manner to a steering column carrying steering wheel 22. An outer member 64 of valve 42 may define a recirculating ball screw 66 that extends into bore 52 of piston 38. Screw 66 defines a plurality of threads 68 configured to receive a plurality of balls 70 that circulate through the threads 54 in piston 38 and the threads 68 in screw 66. A torsion bar 72 may be coupled to members 62, 64, and biases members 62, 64 to predetermined relative positions. Rotation of inner member 62 responsive to inputs through steering wheel 22 twists torsion bar 72 and establishes a biasing force urging members 62, 64 to return to their predetermined relative positions.

In operation, rotation of steering wheel 22 by the vehicle operator causes rotation of inner member 62 of valve 42 relative to outer member 64 of valve 42. The change in relative position of members 62, 64 opens fluid passageways within valve 42 and allows high pressure fluid to flow from pump 30 to one side of the piston 44 (with the side depending on the direction of rotation of steering wheel 22). The change in relative position also twists torsion bar 72 establishing a biasing force in torsion bar 72. The fluid pressure in chamber 44 causes movement of piston 38 to augment the steering forces input by the vehicle operator (and causes fluid to drain from the other side of the piston 38). Movement of piston 38 along axis 50 causes corresponding rotation of Pitman arm shaft 40 about axis 54 and rotation of Pitman arm 34 which converts the rotational motion of shaft 40 into linear motion in linkage 24. Movement of piston 38 along axis 50 also causes rotation of shaft 66 and outer member 64 of valve 42 relative to inner member 62 of valve 42 to return members 62, 64 to their predetermined relative positions (and close valve 42) once the wheels 26 have turned to the extent corresponding to the degree of rotation of the steering wheel 22.

Figure 3:
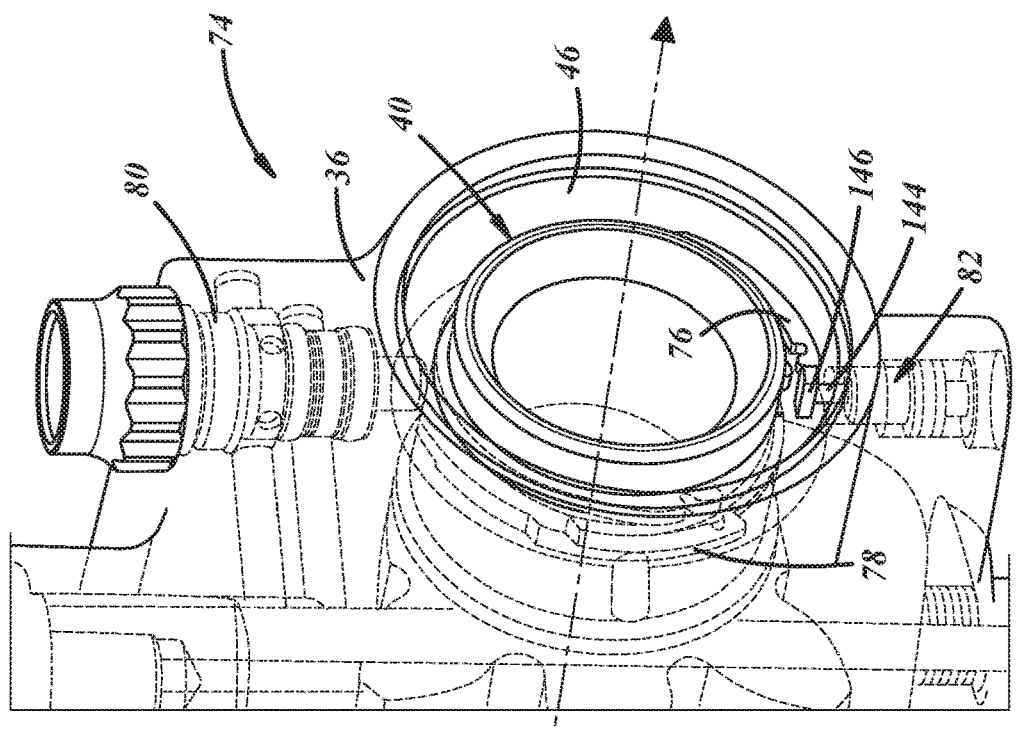
FIG. 3 is a perspective view of one embodiment of an end of travel relief system for the power steering system of FIG. 1 incorporating one embodiment of a device for setting the positions of the actuating rings of the end of travel relief system.

Referring now to FIG. 3, an end of travel (EOT) relief system 74 for power steering system 20 is illustrated. System 74 is provided to limit the power-assisted movement of piston 38 to protect steering components from excess stress. Referring again to FIG. 2, a conventional EOT relief system includes one or more poppet valves that are unseated by the piston 38 when the piston 38 reaches a predetermined extent of travel in either direction along axis 50 and that divert some of the working fluid from a corresponding side of fluid chamber 44. These conventional systems function well for their intended purpose, but often have a limited range of operation due to the available range of movement of the poppet valves. Further, tolerance stack ups in the power steering system can reduce the effective turn angles of a vehicle by causing premature activation of the EOT limit system. Referring again to FIG. 3, system 74 overcomes these issues. System 74 may include a pair of actuating rings 76, 78, one or more valves 80 and means, such as device 82, for setting or establishing the positions of rings 76, 78 relative to Pitman arm shaft 40.

Actuating rings 76, 78 are provided to control the position of valves 80 responsive to linear movement of piston 38 and corresponding rotational movement of Pitman arm shaft 40. Each ring 76, 78 controls the position of valve 80 responsive to linear movement of piston 38 in one direction along axis 50 and corresponding rotational movement of shaft 40 in one rotational direction about axis 58. Actuating rings 76, 78 are configured to be disposed about Pitman arm shaft 40 and axis 58. Referring to FIGS. 4A-4C, each actuating ring 76, 78 is open and extends about only a portion of shaft 40 (e.g., approximately two hundred and seventy (270) degrees). Rings 76, 78 therefore define opposing circumferential ends 84, 86. Rings 76, 78 have a generally spiral shape such that end 86 is disposed further radially from axis 58 than end 84. A radially inner surface 88 of each ring 76, 78 defines a plurality of splines configured for engagement with splines on a radially outer surface of Pitman arm shaft 40 such that rings 76, 78 rotate with shaft 40 in the absence of any external force. Each ring 76, 78 has a radial spring force biasing the ring 76, 78 to contract towards shaft 40 and axis 58. Rings 76, 78 may be expanded by application of a force to either circumferential end 84, 86 of the ring 76, 78 to allow the ring 76, 78 to be displaced or indexed about shaft 40 and axis 58. Upon removal of the force, rings 76, 78 contract to their default shape in engagement with shaft 40 in which the splines on surface 88 mesh with the splines on shaft 40. Rings 76, 78 each define a radially outwardly extending cam 90 between ends 84, 86 of the ring 76, 78. Cam 90 is configured to engage and control the position of a member of valve 80 in order to selectively divert fluid from chamber 44 on one side of piston 38 as piston 38 reaches a predetermined end of travel limit. In one embodiment, cams 90 are configured to engage valve 80 within two (2) degrees of the desired axle stop setting. Cams 90 may span about thirty (30) degrees in one embodiment. Rings 76, 78 are individually positioned on shaft 44. Rings 76, 78 are axially offset relative to axis 58 and may be axially adjacent to one another. Rings 76, 78 are arranged such that the cams 90 are also circumferentially offset. Further, rings 76, 78 are mounted on shaft 40 in opposing or a mirrored orientation such that the end 84 of one ring 76 is generally axially aligned with the opposite end 86 of ring 78 and, likewise, end 86 of ring 76 is generally axially aligned with the end 84 of ring 78 (best shown in FIGS. 9A-9C).

Figure 5:
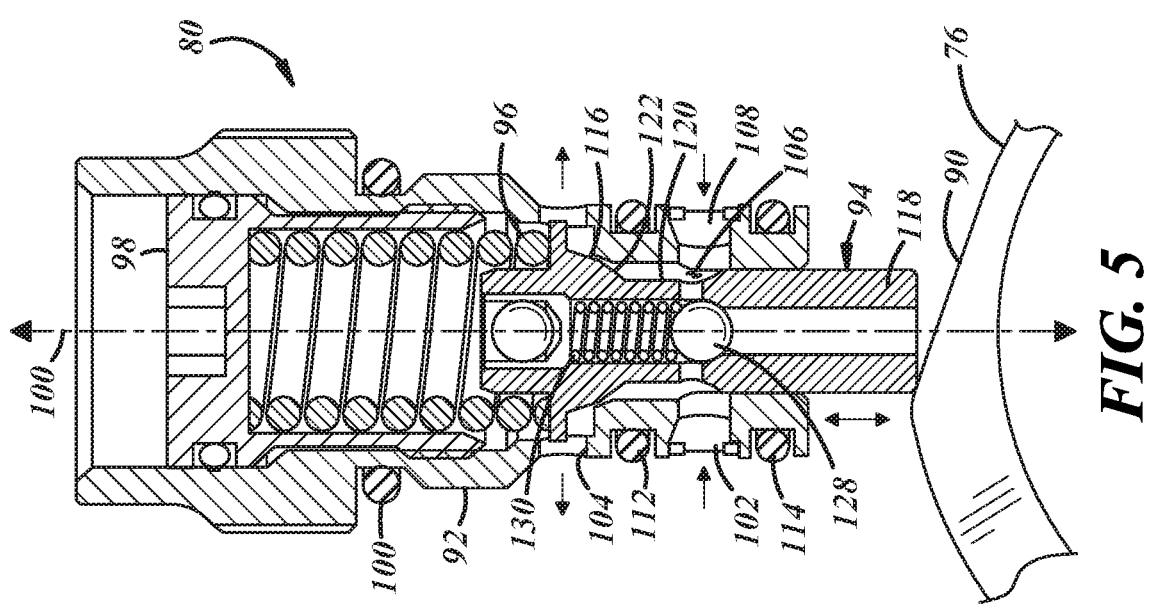
FIG. 5 is a partial cross-sectional view of a portion of the end of travel relief system of FIG. 3.

Referring to FIG. 5, valve 80 diverts fluid from chamber 44 to provide end of travel relief. Valve 80 may also act as a pressure relief valve or bypass valve to move fluid from one side of piston 38 to the other side of piston 38 within chamber 44 when pump 30 is not operating to prevent over pressurization of power steering assembly 20. Valve 80 may comprise a poppet valve that is actuated by both actuating rings 76, 78. It should be understood, however, that rings 76, 78 may alternatively act on different valves. Valve 80 includes a housing 92, a valve member 94, a spring 96 and an adjusting nut 98.

Housing 92 is generally cylindrical in shape and disposed about an axis 100. Housing 92 defines a radially extending inlet 102 and a radially extending outlet 104 configured for fluid communication with an axially extending central channel 106. In the illustrated embodiment, inlet 102 is covered by a screen 108 or filter disposed with a circular channel formed in a radially outer surface of housing 92. Inlet 102 is in fluid communication with the portions of chamber 44 on either side of piston 38. Housing 92 may further define one or more grooves in a radially outer surface configured to receive fluid seals 110, 112, 114. A radially inner surface of housing 92 defines a valve seat 116 for valve member 94.

Valve member 94 is configured for movement responsive to contact with cams 90 on one or both of actuating rings 76, 78. Member 94 includes a valve head 118, valve stem 120, and valve body 122. Valve head 118 is configured for engagement with cams 90 on actuating rings 76, 78. Valve stem 120 has a smaller diameter than valve head 118 and valve body 122 and defines an annular fluid channel between the radially inner surface of valve housing 92 and the radially outer surface of valve member 94. When valve 80 is closed as illustrated in FIG. 5, this channel is open to inlet 102, but closed to outlet 104. Valve body 122 is configured for engagement with valve seat 116 in housing 92 when valve 80 is in a closed position to prevent fluid flow between fluid inlet 102 and fluid outlet 104. In the illustrated embodiment, valve body 122 and valve seat 116 are hemispherical in shape. It should be understood, however, that the shape of valve body 122 and valve seat 116 may vary as long as the shapes of valve body 122 and valve seat 116 are complementary and may, for example, be tapered, disc-shaped or conical in other embodiments. Valve member 94 further defines a longitudinal bore 124 extending along axis 100. Bore 124 is shaped to define a valve seat 126. A check valve member 128 may be disposed within bore 124 and biased against seat 126 by spring 130. Valve 128 allows fluid to recirculate through steering gear 32 whenever exhaust pressure exceeds inlet pressure to prevent hydraulic lock during a power off condition. In the illustrated embodiment, member 128 comprises a ball.

Spring 96 biases valve member 94 in a first direction along axis 100 (downward in the drawing) such that valve body 122 of valve member 94 engages valve seat 116 of valve housing 92. Spring 96 is seated between valve body 122 of valve member 94 and a surface of adjusting nut 98.

Adjusting nut 98 allows variation of the cracking pressure of valve 80. Nut 98 defines a plurality of threads on a radially outer surface configured to engage a corresponding plurality of threads on a radially inner surface of housing 92. Nut 98 may define a groove in a radially outer surface configured to receive a fluid seal positioned between the radially outer surface of nut 98 and the radially inner surface of valve housing 92. Nut 98 may further define an axially extending recess configured to receive and seat one end of spring 96. Rotation of the nut 98 adjusts the force generated by spring 96 on valve member 94.

Valve member 94 may be moved against the force of spring 96 to provide both end of travel relief and pressure relief. In particular, when the end of travel limits are reached for piston 38 and shaft 40, a cam 90 on one of actuating rings 76, 78 will apply a force against valve head 118 of valve member 94 exceeding the force of spring 96. This force moves valve body 122 of valve member 94 off of valve seat 116 in housing 92 and establishes fluid communication between fluid inlet 102 and fluid outlet 104 to allow fluid to flow out of chamber 44 from one side of piston 38. When the fluid pressure in chamber 44 exceeds the cracking pressure (as defined by the forced exerted by spring 96 and set by nut 98), the force of the fluid pressure will exceed the force of spring 96 and cause valve body 122 of valve member 94 to lift off of valve seat 116 to allow fluid flow from inlet 102 to outlet 104 thereby relieving pressure at inlet 102. When the pressure at inlet 102 is lowered sufficiently, valve 80 closes and flow is shut off.

Referring again to FIGS. 4A-4C, one embodiment of a device 82 for setting or establishing the positions of rings 76, 78 relative to Pitman arm shaft 40 will now be described. Device 82 includes a fixed member 132 and a movable member 134. As used herein, "fixed" and "movable" as applied to members 132, 134 refers to the potential for members 132, 134 to move, after installation of device 82 in housing 36 of steering gear 32, along a longitudinal axis 136 of device 82 that extends perpendicular to the rotational axis 58 of sector gear shaft 40 and actuating rings 76, 78.

In the illustrated embodiment, fixed member 132 comprises a screw that is configured for rotation about axis 136, but does not move along axis 136. Member 132 defines a plurality of threads on a radially outer surface. Member 132 may define a recess 138 in one axial end configured to receive a tool used for rotating member 132 about axis 136.

Movable member 134 is configured for movement along axis 136 relative to fixed member 132. Movable member 134 comprises a nut having a tubular body 140 and a pin 142 extending from body 140.

Body 140 has a closed end from which pin 142 extends and an open end configured to receive fixed member 132. Body 140 defines a plurality of threads on a radially inner surface configured for engagement with the plurality of threads on the radially outer surface of member 132. The threads on members 132, 134 provide a means for inhibiting movement of movable member 134 along longitudinal axis 136 in the absence of a positioning force causing rotation of fixed member 132. An outer diameter of body 140 may have an eccentric shape that is complementary to the shape of a bore in housing 36 of steering gear 32 in which device 82 is disposed in order to prevent rotation of movable member about axis 136 (see FIG. 3).

Pin 142 is configured for engagement with ends 84, 86 of actuating rings 76,78 in order to position rings 76,78 relative to shaft 40. Referring to FIG. 3, pin 142 may be rectilinear, and in particular, rectangular, in cross-section and may include a stem 144 and a head 146. In the illustrated embodiment, both the width of head 146 (in the circumferential direction relative to axis 58) and depth of head 146 (in a direction parallel to axis 58) are greater than the width and depth of stem 144 such that head 146 protrudes further outward than stem 144 in the circumferential direction relative to axis 58 and in a direction parallel to axis 58. Pin 142 defines surfaces on opposed circumferential sides of head 146 of pin 142 that are configured for engagement with ends 84, 86 of actuating rings 76,78.

Referring again FIGS. 4A-4C, device 82 operates in the following manner. When shipped to a customer, rings 76, 78 are installed on shaft 40 in such a way that ends 84, 86 of rings 76, 78 are circumferentially spaced from pin 142 of device 82 when sector gear 60 of shaft 40 is in a centered or neutral position. When shipped, device 82 may already be in a "set" position shown in FIG. 4A. In the set position, body 134 is moved to its further extent in one direction along axis 136 radially inwardly towards rotational axis 58 of shaft 40 and rings 76, 78. If device 82 is not already in the set position, a positioning force may be applied to fixed member 132 to cause rotation of fixed member 132 about axis 136 and movement of movable member 134 along axis 136 until device 82 assumes the set position as illustrated in FIG. 4A. In the set position, pin 142 is configured to engage the end 84 of each actuating ring 76, 78 during rotation of the actuating rings 76, 78 in opposite rotational directions about axis 58 in order to set a position of each actuating ring relative to shaft 40. Ring 76 is set by rotating shaft 40 in one direction about axis 58 from the centered or neutral position to a full stop position. As shaft 40 is rotated, end 84 of ring 76 engages one side of head 146 of pin 142 causing ring 76 to expand and index along shaft 40. End 86 of ring 78 proceeds past the narrower stem 144 of pin 142 such that ring 78 continues to rotate with shaft 40. Ring 78 may then be set by rotating shaft 40 in the opposite direction about axis 58 to a full stop position. As shaft 40 is rotated, end 84 of ring 78 engages the opposite side of head 146 of pin 142 causing ring 78 to expand and index along shaft 40. End 86 of ring 76 proceeds past the narrower stem 144 of pin 142 such that ring 76 continues to rotates with shaft 40. Shaft 40 is then returned to its center or neutral position which locates cams 90 of rings 76, 78 equidistant from valve 80 and in a position to engage valve 80 at the predetermined end of travel limits for piston 38 (and Pitman arm shaft 40). In one embodiment, rings 76, 78 provide an activation range of up to approximately fifty (50) degrees.

Once the positions of rings 76, 78 are set, a positioning force is again applied to fixed member 132 to cause rotation of member 132 and movement of member 134 along axis 136 to a "running" position shown in FIG. 4B. In the running position, body 134 is positioned at its further extent along axis 136 away from rotational axis 58 of shaft 40 and rings 76, 78. In the running position, pin 142 remains disengaged from ends 84, 86 of actuating rings 76, 78 during rotation of the actuating rings 76, 78 with shaft 40 about axis 58 in either rotational direction.

Whenever it is desired to reset the actuating rings 76, 78 to their initial (shipped) positions, a positioning force is again applied to fixed member 132 to cause rotation of member 132 and movement of member 134 along axis 136 to a "reset" position shown in FIG. 4C. In the reset position, member 134 and pin 142 are located at an intermediate position along axis 136 relative to the set and running positions (FIGS. 4A and 4B) and pin 142 is configured to engage end 86 of each actuating ring 76, 78 during rotation of the actuating rings 76, 78 in opposite rotational directions about axis 58. The direction of rotation for each actuating ring 76, 78 during reset of the actuating rings 76, 78 will be opposite to the direction of rotation for the ring 76, 78 during setting of the actuating ring 76, 78. During the reset process, shaft 40 is first rotated in one direction about axis 58 causing end 86 of ring 76 to engage pin 142 (note that end 86 of ring 76 will engage a surface on the opposite circumferential side of head 146 of pin 142 relative to surface of head 146 engaged by end 84 of ring 76). This action causes ring 76 to expand and index along shaft 40. End 84 of ring 78 passes radially inward of pin 142 such that ring 78 continues to rotate with shaft 40. Ring 78 may then be reset by rotating shaft 40 in the opposite direction about axis 58 causing end 86 of ring 78 to engage pin 142 (note again that end 86 of ring 78 will engage a surface on the opposite circumferential side of head 146 of pin 142 relative to the surface engaged by end 84 of ring 78). This action causes ring 78 to expand and index along shaft 40. End 84 of ring 76 passes radially inward of in 142 such that ring 76 continues to rotate with shaft 40.

Figure 6:
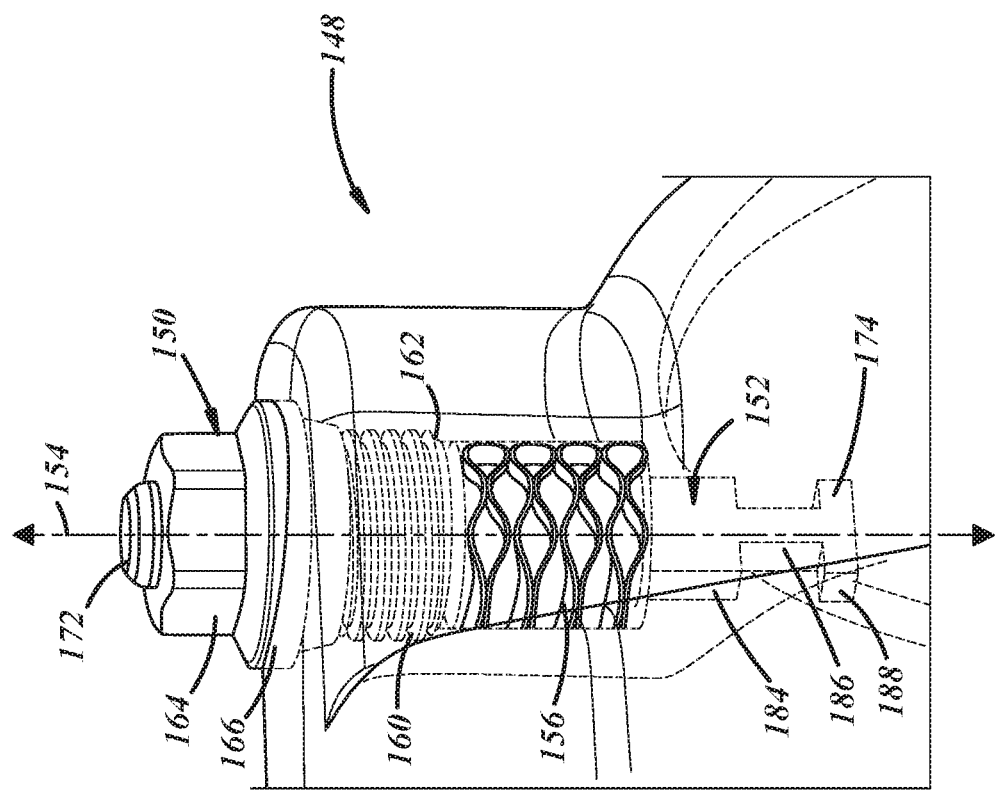
FIG. 6 is a perspective view of another embodiment of a device for setting the positions of the actuating rings in an end of travel relief system.

Referring now to FIGS. 6-8, another embodiment of a device 148 for setting or establishing the positions of rings 76, 78 relative to sector gear shaft 40 is described. Device 148 again includes a fixed member 150 and a movable member 152. As used herein, "fixed" and "movable" as applied to members 150, 152 again refers to the potential for members 150, 152 to move along a longitudinal axis 154 of device 148 that extends perpendicular to the rotational axis 58 of Pitman arm shaft 40 and actuating rings 76, 78. Device 148 further includes a spring 156 and a ball 158.

Referring to FIGS. 6 and 8, fixed member 150 comprises a tubular body that is fixed in position within housing 36 of steering gear 28 and fixed against movement along axis 154. A radially outer surface of member 150 defines a plurality of threads 160 at one axial end of member 150 configured to engage corresponding threads within a bore 162 in housing 36. The outer surface further defines a plurality of flats 164 at the opposite axial end of member 150 that may be gripped by a conventional tool for rotating member 150 about axis 154 and locating member 150 within bore 162 and relative to member 152 during installation. The outer surface may further define a radially outwardly extending flange 166 between the axial ends of member 150 configured to engage a shoulder formed in bore 162 to locate member 150 at a proper depth along axis 154. Referring to FIGS. 7-8, a radially inner surface of member 150 defines a through bore 168 through which movable member 152 extends. The inner surface further defines an outer ball race 170 that his hemispherical in shape and in communication with bore 168. Race 170 is configured to receive ball 158.

Figure 9:
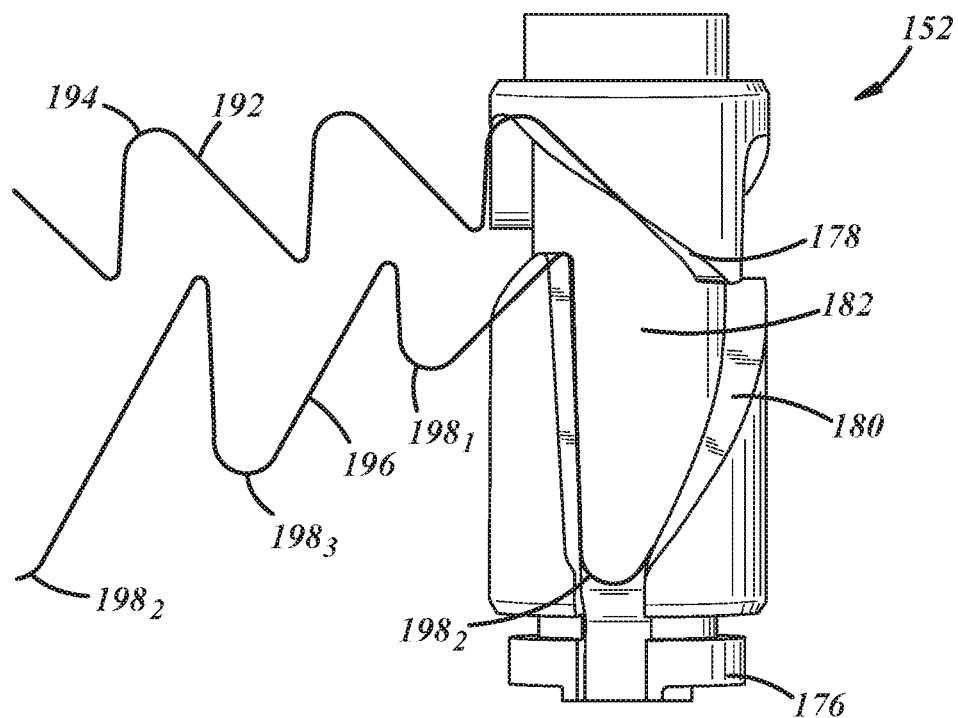
FIG. 9 is an enlarged perspective view of a portion of the device of FIGS. 6-8 along with lines illustrating the paths of surfaces on the portion of the device over one full rotation of the portion of the device.
Figure 10A:
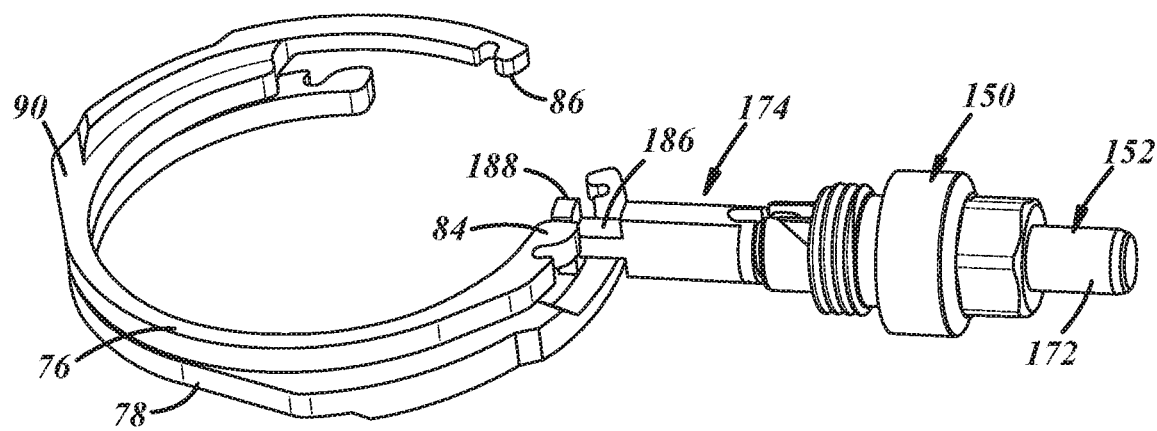

Movable member 152 is configured for movement along axis 154 relative to fixed member 150. Movable member 152 comprises a shaft that is configured be received within bore 168 of member 150 and to move within member 150 along axis 154 in response to a positioning force. The shape of member 152 varies along its length to define a plurality of different features. Member 152 defines a button 172 and a pin 174 at opposite axial ends of member 15. Referring to FIG. 9, member 152 further defines a radially outwardly extending flange 176 adjacent one end of pin 174. Member 152 further defines upper and lower cam surfaces 178, 180 between the axial ends of member 152 and an inner ball race 182 between cam surfaces 178, 180.

Referring again to FIGS. 6-8, button 172 is configured to receive a positioning force applied to device 148 that moves member 152 between several positions as described in greater detail below. In the illustrated embodiment, button 172 is circular in shape, but it should be understood that the shape of button 172 may vary depending on considerations associated with packaging device 148 within the surrounding environment, ergonomics and/or interaction with potential tools.

Pin 174 is configured for engagement with ends 84, 86 of actuating rings 76,78 in order to position rings 76,78 relative to shaft 40. Referring to FIG. 6, pin 174 may be rectilinear, and in particular, rectangular, in cross-section and may include a body 184, a stem 186 and a head 188. In the illustrated embodiment, pin 174 has a constant width (in a circumferential direction relative to axis 58), but the depth (in a direction parallel to axis 58) of body 184 and head 188 are greater than stem 186 such that body 184 and head 188 protrude further outward than stem 184 in either direction parallel to axis 58. Body 184 defines flats on opposite circumferential sides configured to engage corresponding flats in housing 36 to prevent rotation of member 152 about axis 154. Head 188 defines surfaces on opposed circumferential sides that are configured for engagement with ends 84, 86 of actuating rings 76, 78 as discussed in greater detail below.

Referring to FIGS. 7-8, flange 176 is configured to support a snap ring 190 and is disposed between pin 174 and lower cam surface 180. Ring 190 acts as a spring seat for one end of spring 156. The outer diameter of ring 190 is greater than an inner diameter of the fixed member 150, thereby limiting movement of member 152 in one direction (away from axis 58 and shaft 40 and actuating rings 76, 78) along axis 154.

Referring again to FIG. 9, cam surfaces 178, 180 guide ball 158 and move ball 158 in a circle about axis 154 and about a radially outer surface of movable member 152 forming inner ball race 182. The lines in FIG. 9 illustrate the complete shapes of cam surfaces 178, 180 following a full rotation of member 152. Upper cam surface 178 defines a plurality of inclines 192 and peaks 194 while lower cam surface 180 defines a plurality of declines 196 and troughs 198$_1$, 198$_2$, 198$_3$ for controlling the movement and position of ball 158 as described in greater detail below. Each trough 198$_1$, 198$_2$, 198$_3$ defines a resting place for ball 158 and corresponds to a defined position of device 148 as discussed below.

Inner ball race 182 provides a surface along with ball 158 may move as ball 158 is rotated about axis 154 and member 152 during engagement with cam surfaces 178, 180. Inner ball race 182 opposes outer ball race 170 in member 150.

Referring again to FIGS. 6-8, spring 156 provides a means for inhibiting movement of movable member 152 along axis 148 in the absence of a positioning force applied to button 172 of movable member 152. Spring 156 exerts a biasing force that urges member 152 in one direction along axis 154 (away from axis 58, shaft 40 and actuating rings 76, 78) and that opposes the positioning force applied to button 172 of member 152. In the illustrated embodiment, spring 156 comprises a wave spring. It should be understood, however, that a coil spring may also be used. Spring 156 surrounds a portion of pin 174 and is seated between a spring seat formed in movable member 152 (e.g., against an underside of snap ring 190) and a spring seat 200 formed in bore 162 of housing 36. Spring 156 surrounds a portion of pin 174 of member 152.

Ball 158 is disposed between outer ball race 170 in fixed member 150 and inner ball race 182 in movable member 152. Because ball 158 is trapped between races 170, 182, ball 158 is fixed against radial movement relative to axis 154. Further, because of the hemispherical shape of outer ball race 158 in fixed member 150, ball 158 is also fixed against axial movement along axis 154. Ball 158, however, is configured for movement in a circle about axis 154 and about movable member 152 along inner ball race 182 as ball 158 rides along cam surfaces 178, 180 of member 152 as member 152 is moved along axis 154 under the influence of positioning forces applied to button 172 of member 152 and the biasing force applied by spring 156. Referring again to FIG. 9, in the absence of any positioning force applied to button 172, ball 158 is disposed within one of troughs 198$_1$, 198$_2$, 198$_3$. When a positioning fore is applied to button 172, member 152 is moved along axis 154 radially inwardly towards axis 58, shaft 40 and actuating rings 76, 78. This movement brings an incline 192 of upper cam surface 178 into engagement with ball 158. Ball 158 rides along the incline 192 until ball 158 reaches a peak 194 in upper cam surface 178. At this point, further inward movement of member 152 is prohibited providing feedback to the operator. Upon removal of the positioning force by the operator, the biasing force of spring 156 causes member 152 to move in the opposite direction along axis 154 radially outwardly away from axis 58, shaft 40 and actuating rings 76, 78. This movement brings a decline 196 of lower cam surface 180 into engagement with ball 158. Ball 158 rides along the decline 196 until ball 158 reaches a corresponding trough $198_1$, $198_2$, $198_3$ in the lower cam surface 180. At this point, further outward movement of member 152 is prohibited and member 152 has assumed one of three positions: (i) a set position in which the pin 174 of member 152 is configured to engage end 84 of actuating ring 76, 78; (ii) a reset position in which pin 174 is configured to engage end 86 of actuating ring 76, 78; and (iii) a running position in which pin 174 remains disengaged from ends 84, 86 of actuating rings 76, 78 during rotation. In the illustrated embodiment, trough $198_1$ corresponds to the set position, trough $198_2$ corresponds to the running position and trough $198_3$ corresponds to the reset position.

Referring now to FIGS. 10A-10C and 11A-11C, device 148 operates in the following manner. When shipped to a customer, rings 76, 78 are installed on shaft 40 in such a way that ends 84, 86 of rings 76, 78 are circumferentially spaced from pin 174 of device 148 when sector gear 60 of shaft 40 is in a centered or neutral position. When shipped, device 148 may already be in a "set" position shown in FIGS. 10A and 11A. In the set position, member 152 is moved to its furthest extent in one direction along axis 154 towards rotational axis 58 of shaft 40 and rings 76, 78. If device 148 is not already in the set position, a positioning force may be applied to button 172 of member 152. As described above, the positioning force overcomes the biasing force of spring 156, moves member 152 inwardly along axis 154, and brings upper cam surface 178 into engagement with ball 158 causing movement of ball 158 along an incline 192 in upper cam surface 178 until ball 158 reaches a peak 194 in upper cam surface 178. At this point, the positioning force is removed and the biasing force of spring 156 moves member 152 outwardly along axis 154 and brings lower cam surface 180 into engagement with ball 158 causing movement of ball 158 along a decline 196 in lower cam surface 180 until ball 158 reaches a trough 198. This process may be repeated as needed to move ball 158 to the appropriate trough $198_1$ corresponding to the set position and movable member 152 and device 148 to the set position shown in FIGS. 10A and 11A. In the set position, pin 174 is configured to engage the end 84 of each actuating ring 76, 78 during rotation of the actuating rings 76, 78 in opposite rotational directions about axis 58 in order to set a position of each actuating ring relative to shaft 40. Ring 76 is set by rotating shaft 40 in one direction about axis 58 to from the centered or neutral position to a full stop position. As shaft 40 is rotated, end 84 of ring 76 engages one side of head 188 of pin 174 causing ring 76 to expand and index along shaft 40. End 86 of ring 78 proceeds past the narrower stem 186 of pin 174 such that ring 78 continues to rotate with shaft 40. Ring 78 may then be set by rotating shaft 40 in the opposite direction about axis 58 to a full stop position. As shaft 40 is rotated end 84 of ring 78 engages the opposite side of head 188 of pin 174 causing ring 78 to expand and index along shaft 40. End 86 of ring 76 proceeds past the narrower stem 186 of pin 174 such that ring 76 continues to rotate with shaft 40. Shaft 40 is then returned to its center or neutral position which locates cams 90 of rings 76, 78 equidistant from valve 80 and in a position to engage valve 80 at the predetermined end of travel relief for piston 38 (and Pitman arm shaft 40). In one embodiment, rings 76, 78 provide an activation range of up to approximately fifty (50) degrees.

Figure 11C:
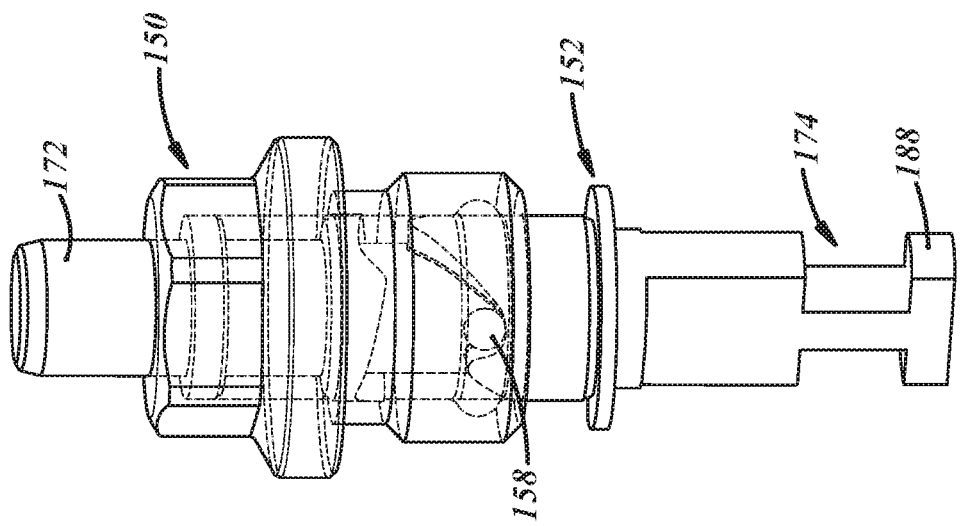
FIGS. 11A-C are perspective views of the device of FIGS. 6-8 in three operating states with certain external portions of the device made transparent to allow illustration of internal portions of the device in three operating states: a setting state in which the device moves the actuating rings of the system from their default positions to initial operating positions; a running state during normal operation of the power steering system; and a reset state during which the devices returns the actuating rings to their default positions.
Figure 11B:
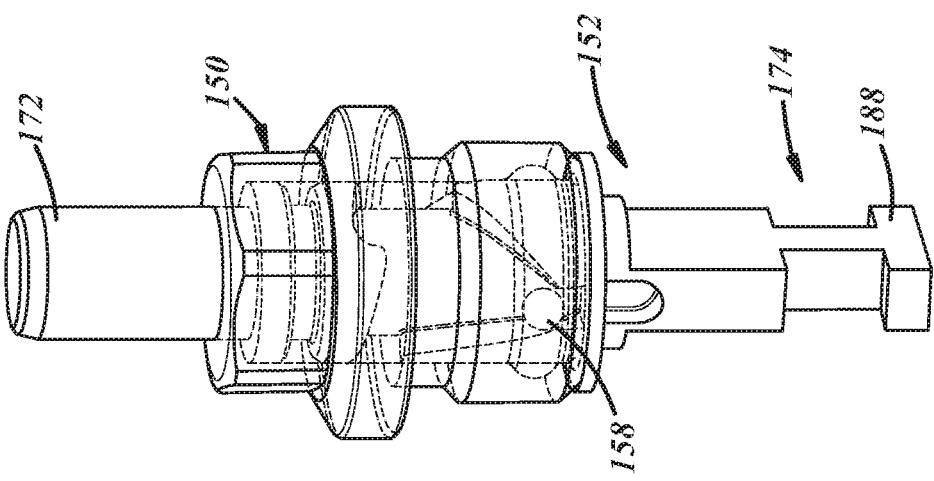
Figure 11A:
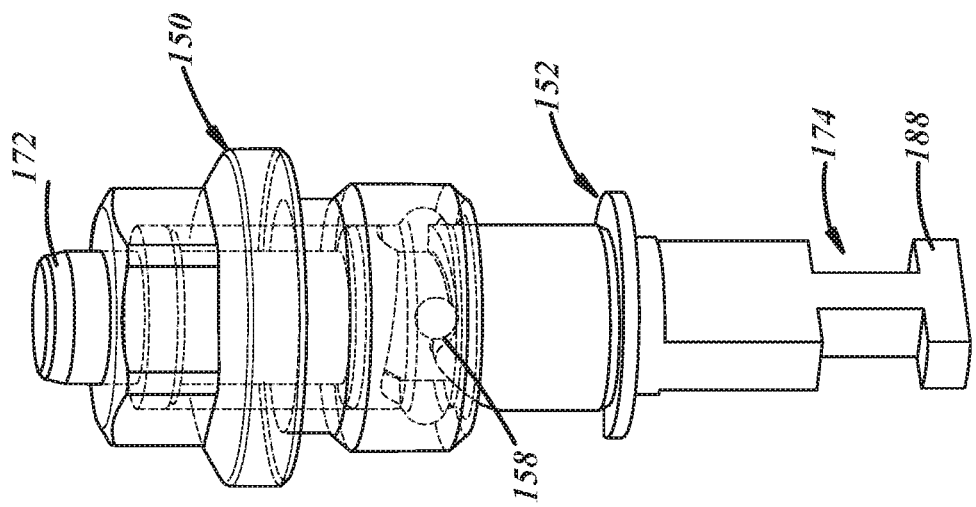

Once the positions of rings 76, 78 are set, a positioning force is again applied to button 172 of movable member 152 to move member 152 and device 148 from the "set" position to the "running" position shown in FIGS. 10B and 11B. In the running position, member 152 is positioned at its further extent along axis 154 away from rotational axis 58 of shaft 40 and rings 76, 78. In the running position, pin 174 remains disengaged from ends 84, 86 of actuating rings 76, 78 during rotation of the actuating rings 76, 78 with shaft 40 about axis 58 in either rotational direction.

Whenever it is desired to reset the actuating rings 76, 78 to their initial (shipped) positions, a positioning force is again applied to movable member 152 to move member 152 and device 148 from the "running" position to the "reset" position shown in FIGS. 10C and 11C. In the reset position, member 152 and pin 174 are located at an intermediate position along axis 154 relative to the set and running positions and pin 174 is configured to engage end 86 of each actuating ring 76, 78 during rotation of the actuating rings 76, 78 in opposite rotational directions about axis 58. The direction of rotation for each actuating ring 76, 78 during reset of the actuating rings 76, 78 will be opposite to the direction of rotation for the ring 76, 78 during setting of the actuating ring 76, 78. During the reset process, shaft 40 is first rotated in one direction about axis 58 causing end 86 of ring 76 to engage pin 174 (note that end 86 of ring 76 will engage a surface on the opposite circumferential side of head 188 of pin 174 relative to the circumferential side of head 188 engaged by end 84 of ring 76). This action causes ring 76 to expand and index along shaft 40. End 84 of ring 78 passes radially inward of pin 174 such that ring 78 continues to rotate with shaft 40. Ring 78 may then be reset by rotating shaft 40 in the opposite direction about axis 58 causing end 86 of ring 78 to engage pin 174 (note again that end 86 of ring 78 will engage a surface on the opposite circumferential side of head 188 of pin 174 relative to the circumferential side of head 188 engaged by end 84 of ring 78). This action causes ring 78 to expand and index along shaft 40. End 84 of ring 76 passes radially inward of pin 174 such that ring 76 continues to rotate with shaft 40.

A power steering system 20 and, in particular, an end of travel relief system 74 for a power steering system 20, in accordance with the present teachings are advantageous relative to conventional systems. The end of travel relief system 74 has a greater range of operation than conventional systems because the system is not dependent on the operating length of the poppet valve and can instead be controlled through appropriate formation of the cams on the actuating rings 76, 78. The system 74 also enables vehicle manufacturers and owners to account for tolerance stack ups in the power steering system 20 that may otherwise cause premature activation of the end of travel relief system and reduce the effective turn angles of a vehicle by allowing easy adjustment of the position of the actuating rings 76, 78 relative to the sector gear shaft 40. In this regard, the devices 82, 148 described herein for adjusting the position of the actuating rings 76, 78 offer particular advantages because they are relatively inexpensive, occupy relatively little space and not overly complex in design.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. A device for setting a position of an actuating ring relative to a Pitman arm shaft on which the actuating ring is disposed, the Pitman arm shaft configured for rotation about a rotational axis and the actuating ring forming part of an end of travel relief system for a power steering system, the device comprising:
   a fixed member configured to be positioned about a longitudinal axis extending perpendicular to the rotational axis and to be fixed against movement along the longitudinal axis; and,
   a movable member configured for movement along the longitudinal axis relative to the fixed member, the movable member defining a pin at a first end configured for engagement with first and second circumferential ends of the actuating ring
   wherein a positioning force applied to one of the fixed member and the movable member causes movement of the movable member along the longitudinal axis between (i) a set position in which the pin is configured to engage the first circumferential end of the actuating ring during rotation of the actuating ring in a first direction about the rotational axis, (ii) a reset position in which the pin is configured to engage the second circumferential end of the actuating ring during rotation of the actuating ring in a second direction, opposite the first direction, about the rotational axis, and (iii) a running position in which the pin remains disengaged from the first and second circumferential ends of the actuating ring during rotation of the actuating ring about the rotational axis in the first and second directions.

2. The device of claim 1 wherein the pin defines first and second surfaces on opposite sides of the pin, each of the first and second surfaces configured for engagement with a corresponding one of the first and second circumferential ends of the actuating ring.

3. The device of claim 1, further comprising means for inhibiting movement of the movable member along the longitudinal axis in the absence of the positioning force.

4. The device of claim 1 wherein the fixed member comprises a tubular body defining an outer ball race in a radially inner surface and the movable member comprises a shaft configured to be received within the tubular body and to move within the tubular body along the longitudinal axis in response to the positioning force, the shaft defining a button at a second end opposite the first end configured to receive the positioning force, upper and lower cam surfaces between the first and second ends of the shaft, and an inner ball race disposed between the upper and lower cam surfaces and opposing the outer ball race and wherein the device further includes a ball disposed between the inner and outer ball races and fixed against axial and radial movement relative to the longitudinal axis, application of the positioning force causing movement of the ball along the upper and lower cam surfaces and around the rotational axis thereby allowing movement of the shaft along the longitudinal axis between the set position, the reset position and the running position.

5. The device of claim 4 wherein the movable member comprises a nut having a tubular body having a closed end and an open end, the body defining a first plurality of threads on a radially inner surface and the pin extending from the closed end of the body and the fixed member comprises a screw configured to be received within the tubular body and defining a second plurality of threads configured for engagement with the first plurality of threads wherein application of the positioning force causes rotation of the screw and movement of the nut along the longitudinal axis between the set position, the reset position and the running position.

6. The device of claim 5 wherein an outer diameter of the tubular body of the nut has an eccentric shape.

7. The device of claim 4, further comprising a spring exerting a biasing force in a direction opposite the positioning force, the shaft further defining a spring seat configured to seat one end of the spring.

8. The device of claim 7 wherein the spring seat has an outer diameter greater than an inner diameter of the tubular body.

9. The device of claim 7 wherein the spring surrounds the pin.

10. A device for setting a position of an actuating ring relative to a Pitman arm shaft on which the actuating ring is disposed, the Pitman arm shaft configured for rotation about a rotational axis and the actuating ring forming part of an end of travel relief system for a power steering system, the device comprising:
   a tubular body disposed about a longitudinal axis extending perpendicular to the rotational axis, the tubular body defining an outer ball race in a radially inner surface;
   a shaft configured to be received within the tubular body and to move within the tubular body along the longitudinal axis in response to a positioning force, the shaft defining
      a pin at a first end configured for engagement with first and second circumferential ends of the actuating ring
      a button at a second end opposite the first end configured to receive the positioning force
      upper and lower cam surfaces between the first and second ends of the shaft, and
      an inner ball race disposed between the upper and lower cam surfaces and opposing the outer ball race; and,
   a ball disposed between the inner and outer ball races and fixed against axial and radial movement relative to the longitudinal axis,
   wherein a positioning force applied to the button of the shaft causes movement of the ball along the upper and lower cam surfaces and around the rotational axis and movement of the shaft along the longitudinal axis between (i) a set position in which the pin is configured to engage the first circumferential end of the actuating ring during rotation of the actuating ring in a first direction about the rotational axis, (ii) a reset position in which the pin is configured to engage the second circumferential end of the actuating ring during rotation of the actuating ring in a second direction, opposite the first direction, about the rotational axis, and (iii) a running position in which the pin remains disengaged from the first and second circumferential ends of the actuating ring during rotation of the actuating ring about the rotational axis in the first and second directions.

11. A power steering system, comprising:
   a steering gear including a piston configured for movement within a fluid chamber responsive to movement of a steering wheel and fluid pressure on either side of the piston, the piston defining a toothed rack;

a Pitman arm shaft including a sector gear in engagement with the toothed rack and configured for rotation about a rotational axis;

a Pitman arm coupled to the Pitman arm shaft and configured for coupling to a steering linkage; and, an end of travel relief system for the piston comprising:
- a first actuating ring disposed about the Pitman arm shaft and including a first cam extending radially outwardly therefrom;
- a second actuating ring disposed about the Pitman arm shaft and including a second cam extending radially outwardly therefrom;
- a valve including a valve member configured for engagement with at least one of the first and second cams in response to rotation of the Pitman arm shaft about the rotational axis; and,
- a device for setting a position of at least one of the first and second actuating rings relative to the Pitman arm shaft, the device comprising
  - a fixed member disposed about a longitudinal axis extending perpendicular to the rotational axis and fixed against movement along the longitudinal axis;
  - a movable member configured for movement along the longitudinal axis relative to the fixed member, the movable member defining a pin at a first end configured for engagement with first and second circumferential ends of the at least one actuating ring;
  - wherein a positioning force applied to one of the fixed member and the movable member causes movement of the movable member along the longitudinal axis between (i) a set position in which the pin is configured to engage the first circumferential end of the at least one actuating ring during rotation of the at least one actuating ring in a first direction about the rotational axis, (ii) a reset position in which the pin is configured to engage the second circumferential end of the at least one actuating ring during rotation of the at least one actuating ring in a second direction, opposite the first direction, about the rotational axis and (iii) a running position in which the pin remains disengaged from the first and second circumferential ends of the at least one actuating ring despite rotation of the at least one actuating ring about the rotational axis in the first and second directions.

12. The system of claim 11 wherein the pin defines first and second surfaces on opposite sides of the pin, each of the first and second surfaces configured for engagement with a corresponding one of the first and second circumferential ends of the actuating ring.

13. The system of claim 11, further comprising means for inhibiting movement of the movable member along the longitudinal axis in the absence of the positioning force.

14. The system of claim 11 wherein the fixed member comprises a tubular body defining an outer ball race in a radially inner surface and the movable member comprises a shaft configured to be received within the tubular body and to move within the tubular body along the longitudinal axis in response to the positioning force, the shaft defining a button at a second end opposite the first end configured to receive the positioning force, upper and lower cam surfaces between the first and second ends of the shaft, and an inner ball race disposed between the upper and lower cam surfaces and opposing the outer ball race and wherein the device further includes a ball disposed between the inner and outer ball races and fixed against axial and radial movement relative to the longitudinal axis, application of the positioning force causing movement of the ball along the upper and lower cam surfaces and around the rotational axis thereby allowing movement of the shaft along the longitudinal axis between the set position, the reset position and the running position.

15. The system of claim 14 wherein the movable member comprises a nut having a tubular body having a closed end and an open end, the body defining a first plurality of threads on a radially inner surface and the pin extending from the closed end of the body and the fixed member comprises a screw configured to be received within the tubular body and defining a second plurality of threads configured for engagement with the first plurality of threads wherein application of the positioning force causes rotation of the screw and movement of the nut along the longitudinal axis between the set position, the reset position and the running position.

16. The system of claim 15 wherein an outer diameter of the tubular body of the nut has an eccentric shape.

17. The system of claim 14, further comprising a spring exerting a biasing force in a direction opposite the positioning force, the shaft further defining a spring seat configured to seat one end of the spring.

18. The system of claim 17 wherein the spring seat has an outer diameter greater than an inner diameter of the tubular body.

19. The system of claim 17 wherein the spring seat is disposed between the lower cam surface and the pin.

20. The system of claim 17 wherein the spring surrounds the pin.

* * * * *